（12） United States Patent
Kamijima

(10) Patent No.: US 7,327,519 B2
(45) Date of Patent: Feb. 5, 2008

(54) SPATIAL LIGHT MODULATOR AND PROJECTOR

(75) Inventor: Shunji Kamijima, Hara-Mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/418,237

(22) Filed: May 5, 2006

(65) Prior Publication Data

US 2006/0203349 A1    Sep. 14, 2006

Related U.S. Application Data

(63) Continuation of application No. 10/871,044, filed on Jun. 21, 2004, now Pat. No. 7,113,341.

(30) Foreign Application Priority Data

Jul. 16, 2003   (JP)   .............................. 2003-198135

(51) Int. Cl.
*G02B 27/10*   (2006.01)
*G02F 1/1335*   (2006.01)

(52) U.S. Cl. .................. 359/619; 359/625; 349/95; 353/38

(58) Field of Classification Search ................ 359/619, 359/621, 625, 626, 237; 349/8, 9, 95, 110; 353/32, 33, 38
See application file for complete search history.

(56) References Cited

U.S. PATENT DOCUMENTS

| 5,151,801 | A | 9/1992 | Hiroshima |
| 5,621,487 | A | 4/1997 | Shirochi |
| 5,755,501 | A | 5/1998 | Shinohara et al. |
| 6,310,724 | B1 | 10/2001 | Shirochi |
| 6,657,700 | B2 | 12/2003 | Sako et al. |
| 6,882,379 | B1 | 4/2005 | Yokayama et al. |
| 2002/0097358 | A1 | 7/2002 | Ueki et al. |

FOREIGN PATENT DOCUMENTS

| EP | 0 698 804 A2 | 2/1996 |
| JP | 06-130356 | 5/1994 |
| JP | 06-130378 | 5/1994 |
| JP | 08-129168 | 5/1996 |
| JP | A 8-122709 | 5/1996 |
| JP | A-08-248403 | 9/1996 |
| JP | A-2003-140126 | 5/2003 |
| WO | WO 2004/088403 A1 | 10/2004 |

*Primary Examiner*—Huy Mai
(74) *Attorney, Agent, or Firm*—Oliff & Berridge, PLC

(57) ABSTRACT

A spatial light modulator has a modulating unit, a refracting part, and a flat part. The modulating unit includes a matrix of pixels, and a light-shielding portion between each of the pixels. The refracting part is a prism group composed of prism elements, each having at least a refracting surface. The modulated light from one of the pixels is incident on at least a portion of the prism group. The refracting surface is oriented to project an image of the pixel over an image of the light-shielding portion on a screen at a predetermined distance, making an apex with an angle with respect to a reference surface that is orthogonal to an optical axis at the apex. A distance d between the reference surface and the flat part satisfies $d<0.95\times\lambda/(2\times(n-1))$ or $d>1.05\times\lambda/(2\times(n-1))$, $\lambda$ being a wavelength of the light, and n being a refractive index of the prism elements.

3 Claims, 14 Drawing Sheets

SPATIAL LIGHT MODULATOR AND PROJECTOR

CROSS-REFERENCE TO RELATED APPLICATION

This is a Continuation of U.S. application Ser. No. 10/871,044 filed on Jun. 21, 2004, the entire disclosure of which is hereby incorporated by reference in its entirety.

BACKGROUND

The present invention relates to a spatial light modulator and a projector, and more particularly, to a liquid-crystal spatial light modulator.

A dot-matrix display device is widely used as an image display device, such as a liquid crystal panel (a liquid crystal display device), a cathode ray tube (CRT) display device, and a plasma display device. The dot-matrix display device displays an image by a number of pixels that are arranged periodically in two dimensional arrays. However, the periodic arrangement of the pixels causes a sampling noise that deteriorates quality of the image, which makes the image rough and less smooth. One of the methods to reduce deterioration of the quality of the image is disclosed in, for example, Japanese Patent Application Laid-Open No. H8-122709.

The dot-matrix image display device has a light-shielding portion called a black matrix. The black matrix is an area between each of the pixels to suppress an unnecessary light. In recent years, it is getting more popular to watch a large screen from comparatively close distance. For this reason, a watcher may recognize a black matrix image in a conventional dot-matrix image display device, resulting in the deterioration of the quality of the image. The conventional technology disclosed in the Japanese Patent Application Laid-Open No. H8-122709 can hardly reduce the deterioration of the quality of the image caused by the black matrix image.

One of the ideas to prevent the black matrix image from appearing is to input a light from the image display device into a prism group. Flat surfaces of the prism group transmit the light as it is; while refracting surfaces refracts the light. The light transmitted the prism group includes a straight light from the flat surfaces and a refracted light from the refracting surfaces. The refracted light is deflected and forms a pixel image on the black matrix area. As a result, the black matrix image becomes hard to recognize.

However, the characteristics of each prism element that composes the prism group sometimes cause a diffraction due to a variety of factors such as periodic arrangement, depth, arrangement pattern, arrangement pitch. A diffracted light from the prism group is dispersed and irradiated to undesired directions. The diffracted light makes the image blurred, resulting in the deterioration of the quality of the image. Furthermore, when the diffraction occurs in one region of the image display device and does not occur in other region, the displayed image becomes an image having an uneven light intensity in a lattice-pattern, a further deterioration of the quality of the image.

The present invention is made to solve the above problems. The object of the present invention is to provide a spatial light modulator and a projector that display a smooth image of a high-quality without having an image of the light shield portion such as the black matrix.

SUMMARY

The spatial light modulator according to one aspect of the present invention includes a modulating unit that modulates a light based on an image signal and outputs a modulated light, a refracting part that refracts the modulated light, and a flat part that transmits the modulated light. The modulating unit includes a plurality of pixels that are arranged in a matrix, and a light-shielding portion between each of the pixels. The refracting part is a prism group that is composed of a plurality of prism elements, each of the prism elements having at least a refracting surface. The modulated light from one of the pixels is incident on at least a portion of the prism group. The refracting surface is oriented to project an image of the pixel over an image of the light-shielding portion on a screen at a predetermined distance, making an apex with an angle with respect to a reference surface that is orthogonal to an optical axis at the apex. A distance d between the reference surface and the flat part satisfies either of the following conditions $$d < 0.95 \cdot 1/(2 \cdot (n-1)) \quad (1)$$

$$d > 1.05 \cdot 1/(2 \cdot (n-1)) \quad (2)$$

where 1 is a wavelength of the light, and n is a refractive index of the prism elements.

After passing through the pixel part, the light enters into the prism group and is refracted on the refracting surface. The direction of the refraction and the angle of the refraction respectively depend on the direction of the refraction surface and the angle between the refraction surface and the reference surface. In the technology of this invention, the light refracted is configured to form the images of the pixels, so that the images of the pixels are superposed on the images of the light-shielding portions on the screen at predetermined distance from the refraction surface. Consequently, the watchers see the smooth and less-rough image without seeing the image of the light-shielding portion.

In the prism group, the light is refracted on the refracting surface and the light is diffracted by the depth of the prism element. The technology of the present invention satisfies any one of the conditions (1) and (2)

If the depth d between the reference surface and the refracting surface satisfies the following condition (A)

$$d = 1/(2 \cdot (n-1)) \quad (A)$$

the diffraction efficiency improves. In the technology of the present invention, preferably, the depth d does not cause the diffraction light, or the diffraction light is weak enough to get blurred. To lessen the effect of the diffraction, the value of the depth d may be various as far as the depth d satisfies any one of the conditions (1) or (2). Consequently, the diffraction light lessens and watcher sees the high-quality and smooth image without seeing the image of the black matrix.

Preferably, any one of the following conditions (3) or (4) is satisfied $$d < 0.9 \cdot 1/(2 \cdot (n-1)) \quad (3)$$

$$d > 1.1 \cdot 1/(2 \cdot (n-1)) \quad (4)$$

More preferably, any one of the following conditions (5) or (6) is satisfied $$d < 0.7 \cdot 1/(2 \cdot (n-1)) \quad (5)$$

$$d > 1.3 \cdot 1/(2 \cdot (n-1)) \quad (6)$$

Satisfying any one of the conditions (3) to (6) lessens the diffraction light more, so that the watcher sees the higher-quality image.

The spatial light modulator according to another aspect of the present invention includes a modulating unit that modulates a light based on an image signal and outputs a modulated light, a refracting part that refracts the modulated light, and a flat part that transmits the modulated light. The modulating unit includes a plurality of pixels that are arranged in a matrix, and a light-shielding portion between each of the pixels. The refracting part is a prism group that is composed of a plurality of prism elements, each of the prism elements having at least a refracting surface. The modulated light from one of the pixels is incident on at least a portion of the prism group. The refracting surface is oriented to project an image of the pixel over an image of the light-shielding portion on a screen at a predetermined distance, making an apex with an angle with respect to a reference surface that is orthogonal to an optical axis at the apex. A distance between the reference surface and the flat part and a distance between the reference surface and a predetermined point on the refracting surface are arranged in aperiodic.

The prism group causes the diffraction light and one of the causes is the periodic arrangement of the prism elements. In the technology of the second invention, the distance between the reference surface and the refracting surface and the distance between the reference surface and the flat surface are aperiodic so that the diffraction light ascribable to the periodic arrangement of the prism elements lessens. Consequently, the watcher sees the high-quality and smooth image without seeing the image of the black matrix.

The spatial light modulator according to still another aspect of the present invention includes a modulating unit that modulates a light based on an image signal and outputs a modulated light, a refracting part that refracts the modulated light, and a flat part that transmits the modulated light. The modulating unit includes a plurality of pixels that are arranged in a matrix, and a light-shielding portion between each of the pixels. The refracting part is a prism group that is composed of a plurality of prism elements, each of the prism elements having at least a refracting surface. The modulated light from one of the pixels is incident on at least a portion of the prism group. The refracting surface is oriented to project an image of the pixel over an image of the light-shielding portion on a screen at a predetermined distance, making an apex with an angle with respect to a reference surface that is orthogonal to an optical axis at the apex. The prism group is arranged in a substantially periodic manner, with number of the periods per a unit area of 15 or less.

One of the causes of that the prism group causes the diffraction light is the periodic arrangement of the prism elements. In the technology of the third invention, when the prism elements are arranged along by the lines that are substantially straight, the number of the substantial lines (periods) per unit area is 15 or less, so that the diffraction light ascribable to the periodic arrangement of the prism elements lessens. Consequently, the watcher sees the high-quality and smooth image without seeing the image of the black matrix.

Preferably, the number of the substantial lines (periods) per unit area is 10 to 12. More preferably, the number is 7 to 9. The smaller number of the lines lessens the diffraction light ascribable to the periodic arrangement of the prism elements more certainly.

According to still another aspect of the present invention, the unit area is determined based on numerical apertures of an illumination optical system that supplies the light to the modulating unit and a projection optical system on which the modulated light is incident. Therefore, in the minimal unit area, the periodic arrangement of the prism elements may be limited, so that the light is refracted on the refracting surface of the prism group and the diffraction light ascribable to the periodic arrangement of the prism elements lessens. Consequently, the watcher sees the high-quality and smooth image without seeing the image of the black matrix.

The projector according to still another aspect of the present invention includes a light source that supplies a light, the spatial light modulator according to the above aspects, and a projection lens that projects the light from the spatial light modulator to display an image on a screen. Consequently, the watcher sees the high-quality and smooth image without seeing the image of the black matrix.

The other objects, features, and advantages of the present invention are specifically set forth in or will become apparent from the following detailed descriptions of the invention when read in conjunction with the accompanying drawings.

DETAILED DESCRIPTION OF EMBODIMENTS

Exemplary embodiments of a spatial light modulator and a projector according to the present invention are explained in detail with reference to the accompanying drawings.

Figure 1:
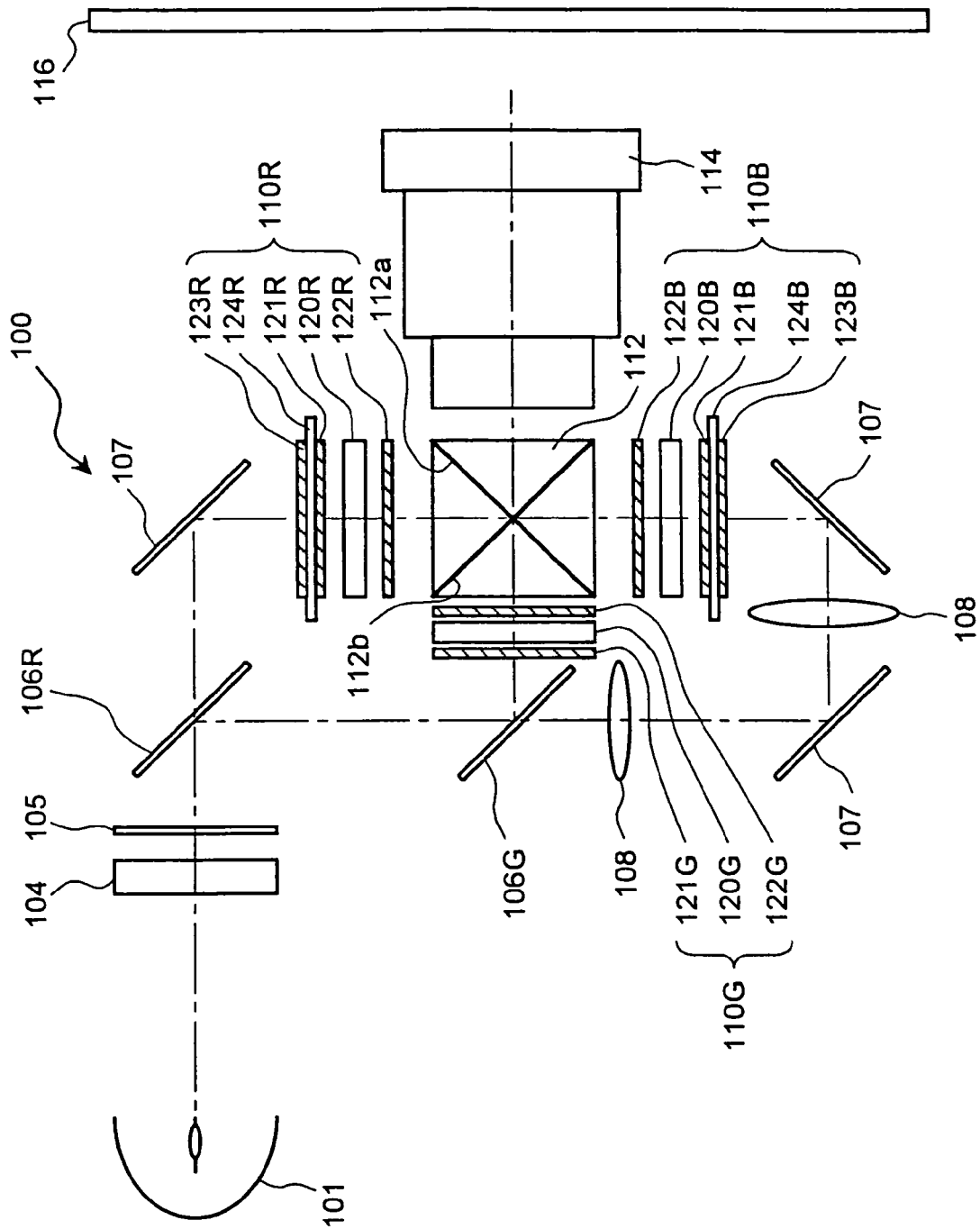
FIG. 1 is a schematic of a projector according to a first embodiment of the present invention.

FIG. 1 is a schematic of a projector according to a first embodiment of the present invention. A super-high pressure mercury lamp 101 generates a light that includes a red light, a green light, and a blue light (hereinafter, "R-light", "G-light", and "B-light", respectively). An integrator 104 uniforms an illuminance distribution of the light. A polarization converter 105 changes the light with the uniform illuminance-distribution into a polarized light such as an s-polarized light. The s-polarized light enters into a red-light transmitting dichroic mirror 106R. The red-light transmitting dichroic mirror 106R transmits the R-light, but reflects the G-light and the B-light. The dichroic mirrors separate the light into the R-light, the G-light, and the B-light in order.

After the R-light passes through the red-light transmitting dichroic mirror 106R, a reflecting mirror 107 bends the R-light by 90 degrees. Then a first-color spatial light modulator 110R, which is a transparent liquid-crystal display device, modulates the R light based on an image signal corresponding to red. The R-light is still s-polarized when the R-light enters into the first-color spatial light modulator 110R, because the dichroic mirrors do not change the polarization direction.

The first-color spatial light modulator 110R includes a ½ wave plate 123R, a glass plate 124R, a first polarizing plate 121R, a liquid crystal panel 120R, and a second polarizing plate 122R. The ½ wave plate 123R and the first polarizing plate 121R sandwich a glass plate 124R, so that the heat does not distort the ½ wave plate 123R and the first polarizing plate 121R. The glass plate 124R is transparent and does not affect the polarization. The second polarizing plate 122R may be attached to the emergent surface of the liquid crystal panel 120R or the incident surface of a cross dichroic prism 112.

The first-color spatial light modulator 110R modulates the R-light as follows. The ½ wave plate 123R changes the s-polarized R light into a p-polarized R light. After passing though the glass plate 124R and the first polarizing plate 121R, the p-polarized R-light enters into the liquid crystal panel 120R. The liquid crystal panel 120R modulates the p-polarized R-light based on the image signal corresponding to red and changes the p-polarized R-light into an s-polarized R-light. Then the second polarizing plate 122R outputs the s-polarized R-light to the cross dichroic prism 112.

The red-light transmitting dichroic mirror 106R deflects the G-light and the B-light by 90 degrees. The blue-light transmitting mirror 106G reflects the G-light, but transmits the B-light. Then a second-color spatial light modulator 110G, which is a transparent liquid-crystal display device, modulates the G-light based on an image signal corresponding to green. The second-color spatial light modulator 110G includes a liquid crystal panel 120G, a first polarizing plate 121G, and a second polarizing plate 122G.

The G-light is s-polarized when the G-light enters into the second-color spatial light modulator 110G. After passing though the first polarizing plate 121G, the s-polarized G-light enters into the liquid crystal panel 120G. The liquid crystal panel 120G modulates the s-polarized G-light based on an image signal corresponding to green and changes the s-polarized G-light into a p-polarized G-light. Then the second polarizing plate 122G outputs the p-polarized G-light to the cross dichroic prism 112.

After passing through the blue-light transmitting mirror 106G, the B-light enters into a third-color spatial light modulator 110B via two relay lenses 108 and two reflecting mirrors 107. The third-color spatial light modulator 110B, which is a transparent liquid-crystal display device, modulates the B-light based on an image signal corresponding to blue.

The B-light goes via the relay lenses 108 because the optical path of the B-light is longer than those of the R-light and the G-light. The relay lenses 108 are configured to transmit the B-light to the third-color spatial light modulator 110B as it is. The third-color spatial light modulator 110B includes a ½ wave plate 123B, a glass plate 124B, a first polarizing plate 121B, a liquid crystal panel 120B, and a second polarizing plate 122B. The configuration of the third-color spatial light modulator 110B is same as that of the first-color spatial light modulator 110R and the explanation is omitted.

The B-light is s-polarized when the B-light enters into the third-color spatial light modulator 110B. The ½ wave plate 123B changes the s-polarized B-light into a p-polarized B-light. After passing though the glass plate 124B and the first polarizing plate 121B, the p-polarized B-light enters into the liquid crystal panel 120B. The liquid crystal panel 120B modulates the p-polarized B-light based on an image signal corresponding to blue and changes the p-polarized B-light into a s-polarized B-light. Then the second polarizing plate 122B outputs the s-polarized B-light to the cross dichroic prism 112. Thus, the red-light transmitting dichroic mirror 106R and the blue-transmitting dichroic mirror 106G separate the light from the super-high pressure mercury lamp 101 into the R-light, the G-light, and the B-light.

The dichroic prism 112 includes two dichroic layers 112a, 112b that are crossed each other. The dichroic layer 112a reflects the B-light and transmits the R-light and the G-light, while the dichroic layer 112b reflects the R-light and transmits the B-light and the G-light. In this manner, the dichroic prism 112 synthesizes the R-light, the G-light, and the B-light that are modulated by the first-color spatial light modulator, the second-color spatial light modulator, and the third-color spatial light modulator, respectively. Then a projection lens 114 projects the light combined by the dichroic prism 112 onto a screen 166 to display a full-color image.

The cross dichroic prism 112 synthesizes the R-light, G-light, and B-light effectively. To synthesize the lights effectively, each spatial-light modulator is configured to output the light with the different polarization direction. When each light enters into the cross dichroic prism 112, the R-light and the B-light is s-polarized while the G-light is p-polarized. This configuration comes from the reflection characteristic of the dichroic layers 112a and 112b. The dichroic layers 112a and 112b usually have the better reflection characteristic in an s-polarized light, so that the dichroic layers 112a and 112b are configured to reflect the R-light and the B-light that are s-polarized and transmit the G-light that is p-polarized.

Figure 2:
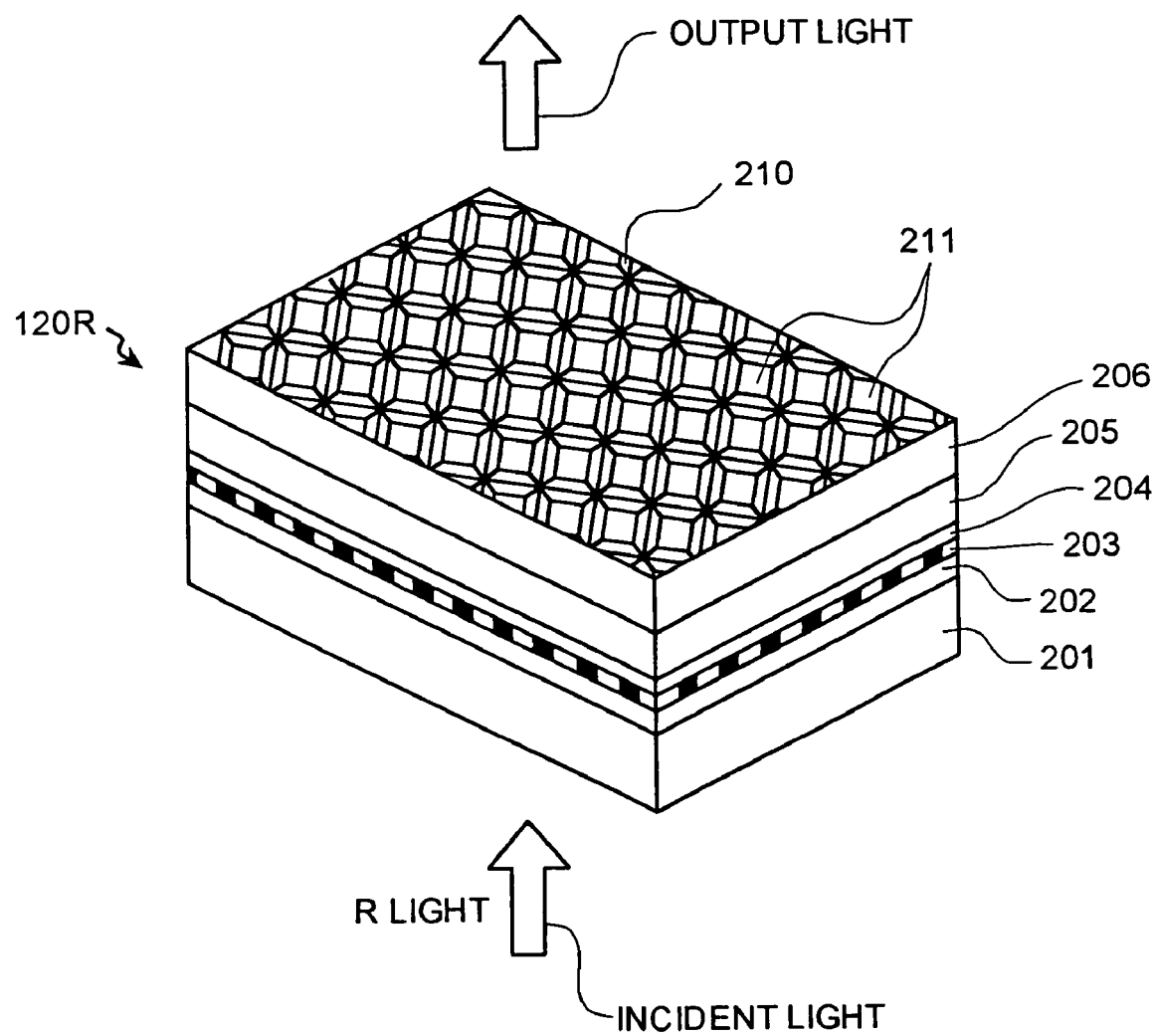
FIG. 2 is a perspective view of a liquid crystal panel according to the first embodiment.

FIG. 2 is a perspective view of a liquid crystal panel according to the first embodiment. The liquid crystal panel is explained in details with the liquid crystal panel 120R. The other two liquid display panels 120G, 120B have the same configuration except the wave-length region.

The liquid crystal panel 120R includes six layers. The incident R-light goes toward a screen 116 passing the layers from the bottom side to the upper side. The layers are in the bottom-up order: an incident-side dust-proof transparent plate 201; an opposed substrate 202; a black matrix layer 203; a liquid crystal layer 204; a TFT substrate 205; and an exit-side dust-proof transparent plate 206. The opposed substrate 202 is formed on the incident-side dust-proof transparent plate 201 while the TFT substrate 205 is formed on the exit-side dust-proof transparent plate 206. The opposed substrate 202 includes transparent electrodes and so on, and the TFT substrate 205 includes thin film transistors (TFT), transparent electrodes, and so on. The opposed substrate 202 and the TFT substrate 205 sandwich the black matrix layer 203 and the liquid crystal layer 204. The black matrix layer 203 is formed on the incident side of the liquid crystal layer 204 and used to decrease the leakage of the light to the outside. The liquid crystal layer 204 is used to display an image.

A prism group 210 is composed of a plurality of prism elements 211 and formed on the exit-side surface of the exit-side dust-proof transparent plate 206, however, may be formed on the second polarizing plate 122R or on the incident-side surface of the cross dichroic prism 112. Similarly, the first polarizing plate and the second polarizing plate may be inserted between other layers, such as between the incident-side dust-proof transparent plate 201 and the opposed substrate 202, between the exit-side dust-proof transparent plate 206 and the TFT substrate 205, and so on as an alternative to the structure shown in FIG. 1.

Figure 3:
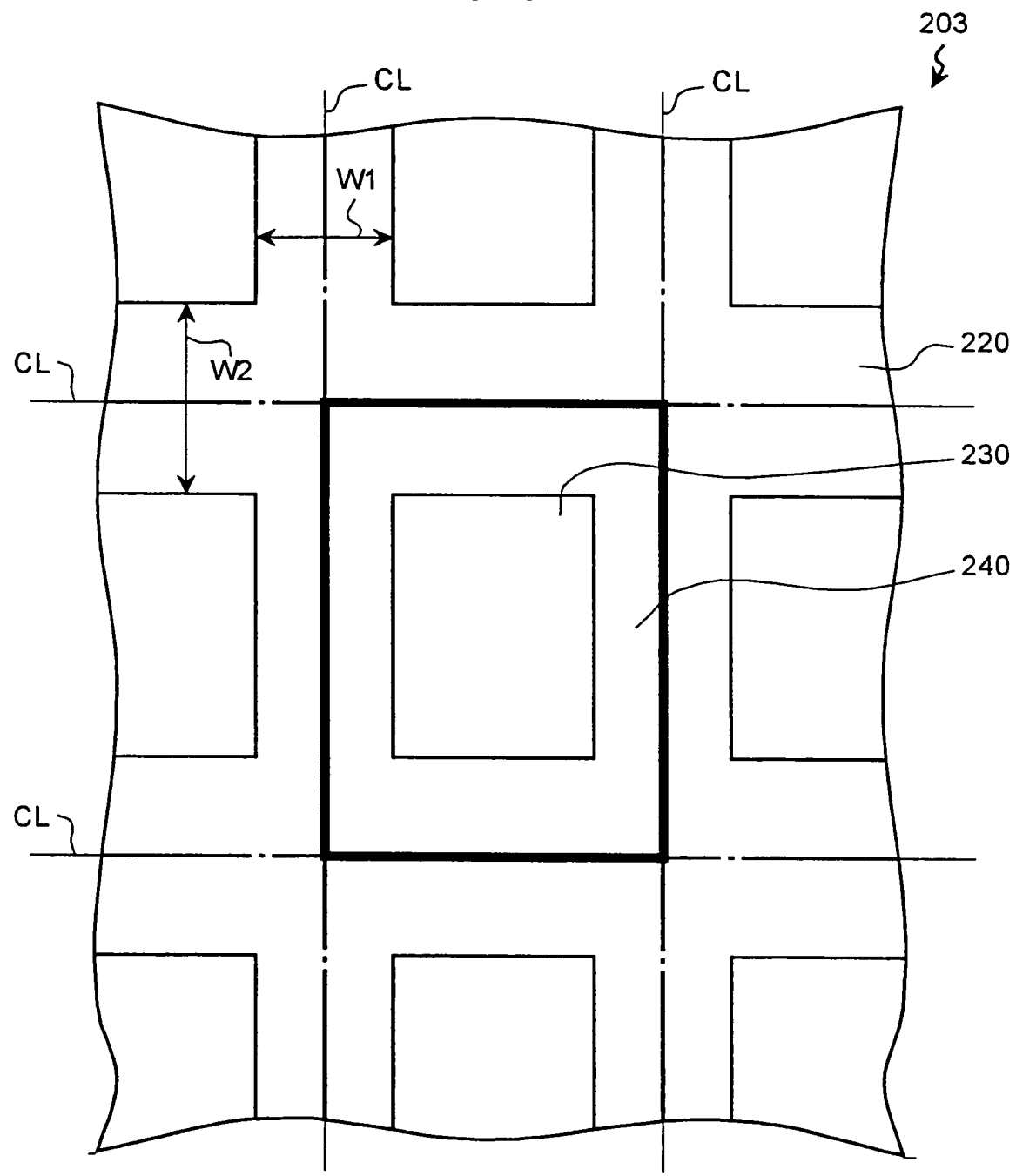
FIG. 3 is a schematic of a black matrix according to the first embodiment.

FIG. 3 is a schematic of the black matrix layer 203 that includes a black matrix part 220 and an opening part 230. The black matrix part 220 blocks out the incident R-light so that the incident R-light does not go toward the screen 116. The black matrix part 220 has predetermined widths W1, W2 and is formed with an orthogonal lattice-pattern. The opening part 230 is a rectangular area that is surrounded by the black matrix parts 220 and transmits the incident R-light. After passing through the opposed substrate 202 to the TFT substrate 205 while being modulated by the liquid crystal layer 204, the incident R-light forms the image of the pixel (hereinafter, "pixel image"). The position and the size of the pixel image are corresponding to those of the opening part 230. CL is a center line of the black matrix part 220, and the center lines surrounds an area 240 that appears periodically, which is shown within a heavy-line frame.

Figure 4:
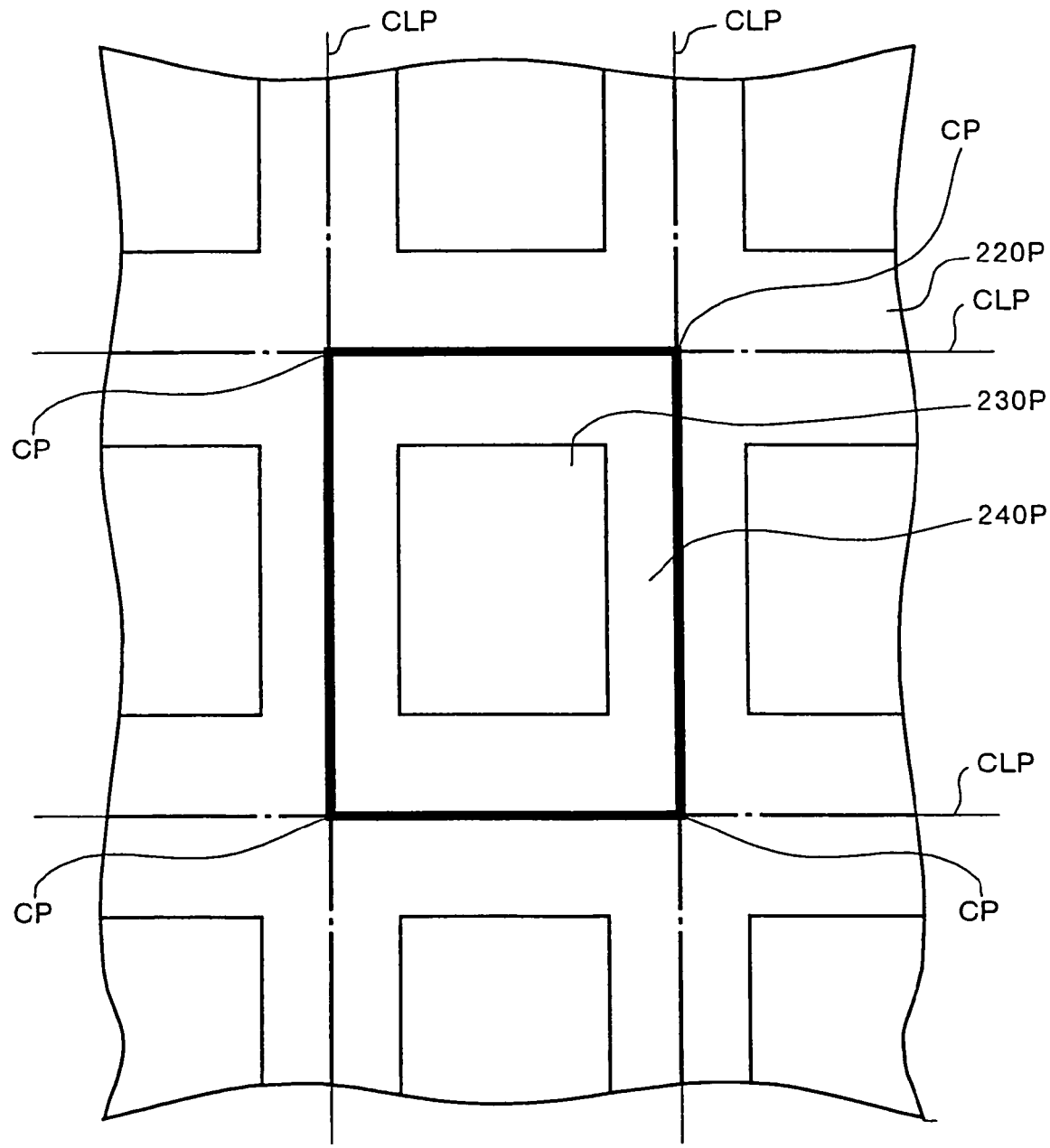
FIG. 4 is a schematic of the black-matrix image according to a conventional image display device.

FIG. 4 is a schematic of an image projected on the screen 116 by a conventional projector. A zonal black-matrix image 220P surrounds an opening image 230P. An image 240P that appears periodically, which is shown within a heavy-line frame, is corresponding to the area 240. An intersection point CP is an intersection point of central-line images CLPs. All the following embodiments are explained with the images that the projection lens 114 projects on the screen 116, because the images that are projected on the screen 116 using the projection lens 114 are considered to be essentially same as the images that are projected on a virtual screen without using the projection lens 114, except a magnification. The virtual screen is assumed to be laid at a predetermined distance from the prism group 210. The former image is projected by the projector 100 and the latter image is projected by the first-color spatial light modulator 110R and the like.

Figure 5:
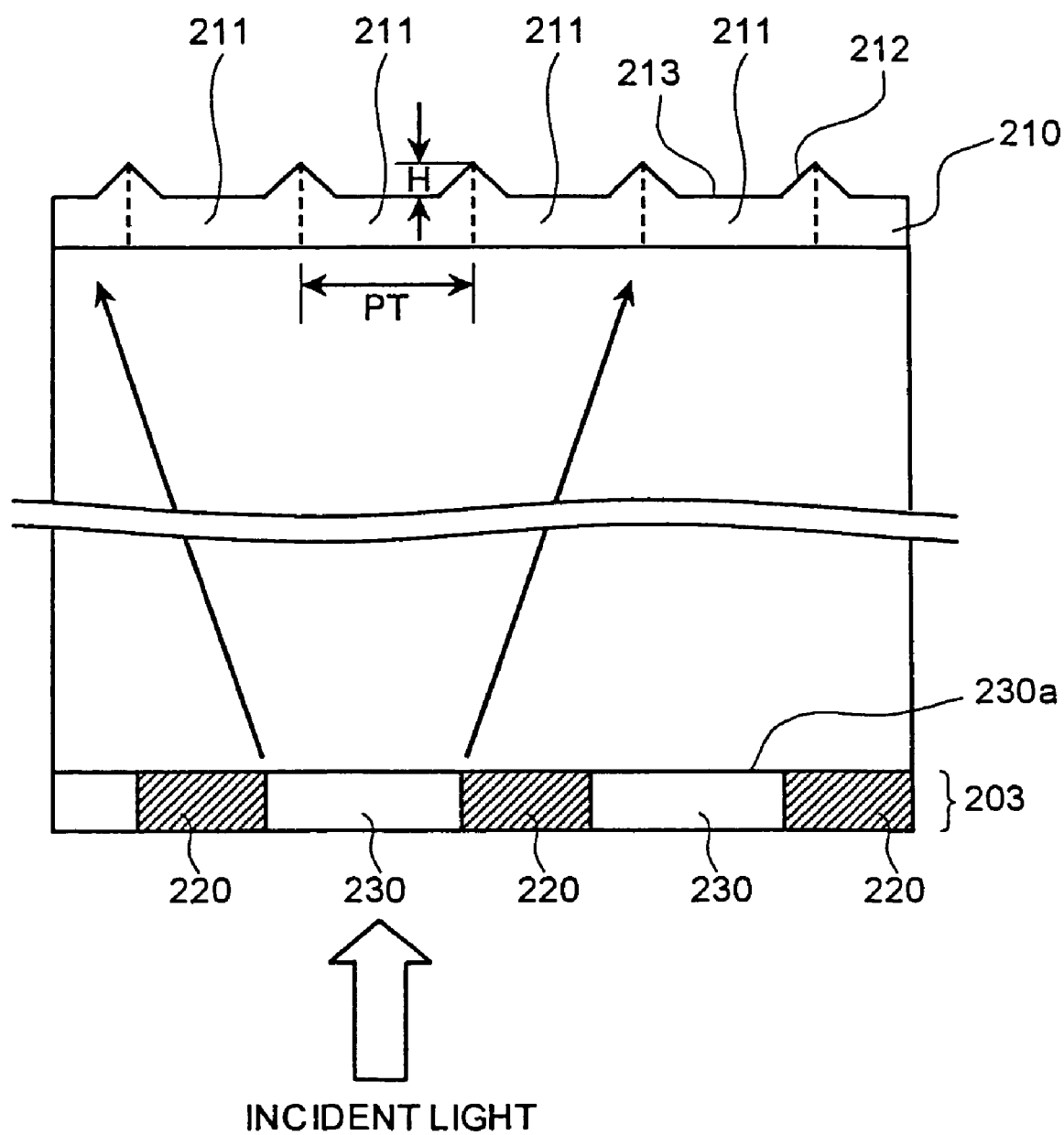
FIG. 5 is a cross section of the liquid crystal panel according to the first embodiment.

FIG. 5 is a cross section of the liquid crystal panel according to the first embodiment. To give a clear explanation, the other components are not shown. After passing through the opening part 230, the R-light diverges conically and enters into the prism group 210 partially. The prism group 210 includes a refracting surface 212 and a flat surface 213. The flat surface 213 is substantially parallel with a surface 230a where the opening parts 230 are formed. A plurality of prism elements 211 are arranged periodically and compose the prism group 210.

Figure 6A:
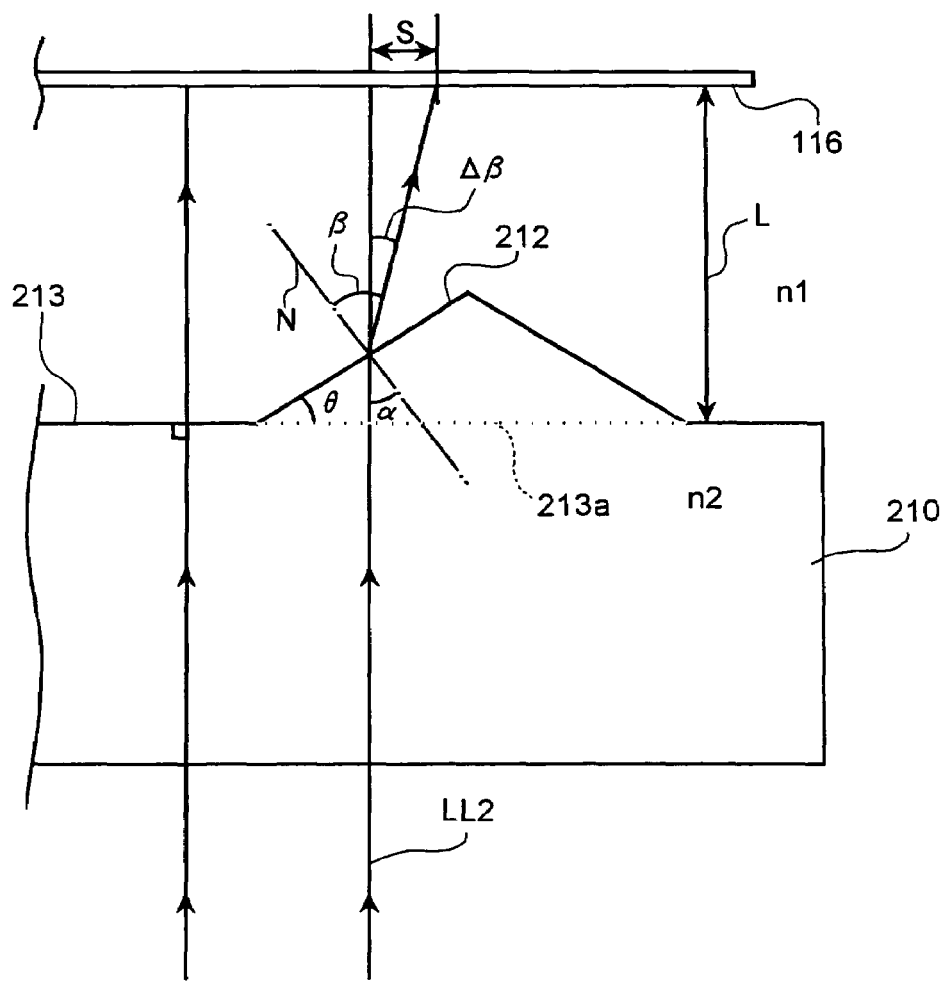
FIG. 6A is a schematic for illustrating a refracting in a prism element according to the first embodiment.

FIG. 6A is a schematic for illustrating a refracting in a prism element according to the first embodiment. The refractive index of the media between the prism group 210 and the screen 116 (such as the air) is n1, the refractive index of the material of the prism group 210 is n2, and the angle between the refracting surface 212 and a reference surface 213a, which is called the angle of gradient, is q. The reference surface 213a corresponds to the flat surface 213 expanded.

The parallel light of the incident light to the prism group 210 is used to give a clear explanation. Some lights enter into the flat surface 213 and some lights enter into the refracting surface 212. The light that enters into the flat surface 213 orthogonally goes as it is and projects the image on the screen without being refracted. On the other hand, the light that enters into the refracting surface 212 is refracted while satisfying with the following conditional equation $$n1 \times \sin b = n2 \times \sin a$$

where a is the angle of the incidence and b is the exit angle that are based on the normal N of the refracting surface 212.

When the screen 116 is laid at a distance L from the prism group 210, and the light is refracted and moves a distance S on the screen 116, the distance S satisfies the following equation:

$$S = L' \tan(Db)$$

$$Db = b - a.$$

The distance S is the moving distance of the opening image 240P on the screen 116 and configured by the angle q of the gradient of the refracting surface 212.

Moreover, the direction where the light beam LL2 is refracted depends on the direction of the refracting surface 212. In other words, the direction where the opening image is formed on the screen 116 is configured by the direction of the refracting surface 212.

Figure 7A:
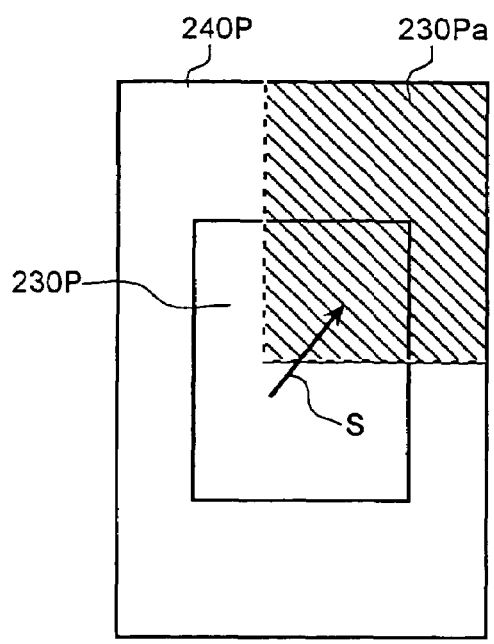
FIG. 7A to FIG. 7D are schematics of projection images according to the first embodiment.

The images that are projected on the screen 116 by the R-light are explained with reference to FIGS. 7(a) to 7(d). FIG. 7A shows an image 240P of an area that appears periodically on the screen 116. The light that enter into the flat surface 213 substantially orthogonally goes straight without being refracted and forms the opening image 230P (a direct transmitted image) in the center of the image 240P.

Figure 6B:
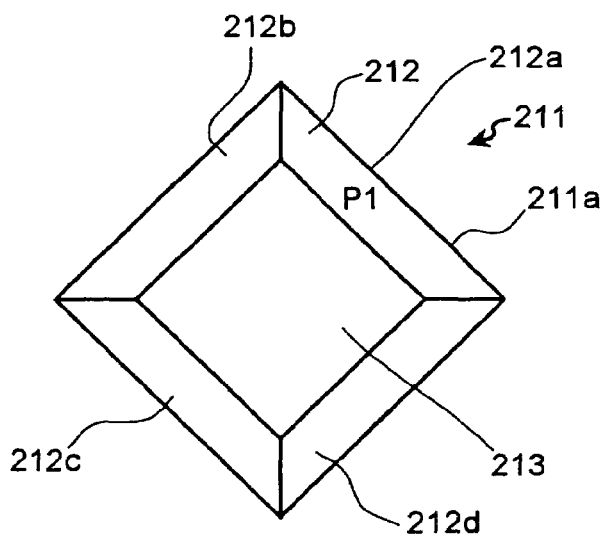
FIG. 6B is a top view of the prism element.

The relationship between the refracting surface and the direction of the refraction is explained with reference to FIG. 6B and FIG. 7. FIG. 6B is a top view of the prism element 211. When the light enters into a refracting surface 212a, the light is refracted with the direction of the refraction, the angle of the refraction, and the quantity of the refraction that are respectively corresponding to the direction of the refracting surface 212a, the angle q of the graduation, and the area P1. The angle between a side 211a and the central line CL on the black matrix layer is formed to be 45 degrees, so that the opening image 230Pa, shown in FIG. 7A, is formed to the direction of an arrow and at the distance S from the opening image 230P (a direct transmitted image). To give a clear explanation, the following two things are assumed in all the explanations: 1) the projection lens 114 does not bring about a flip vertical and a flip horizontal, 2) the watcher always sees the projector 100 from the opposite direction that the light is traveling to. For example, the watcher sees an image projected on the screen 116 from the backside of the screen 116 to see the super-high pressure mercury lamp 101.

Figure 7B:
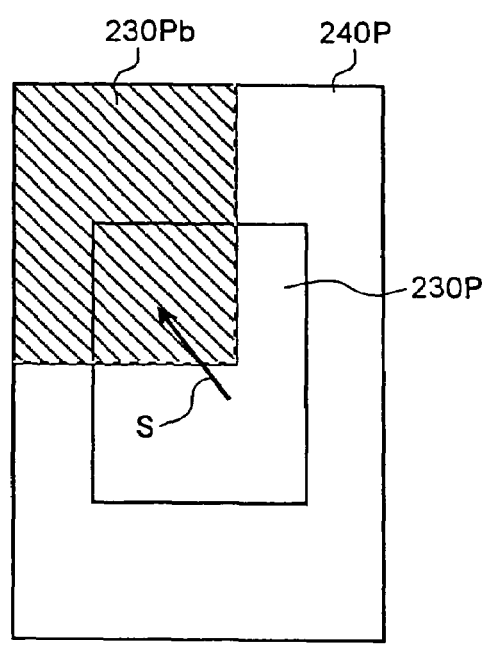
Figure 7C:
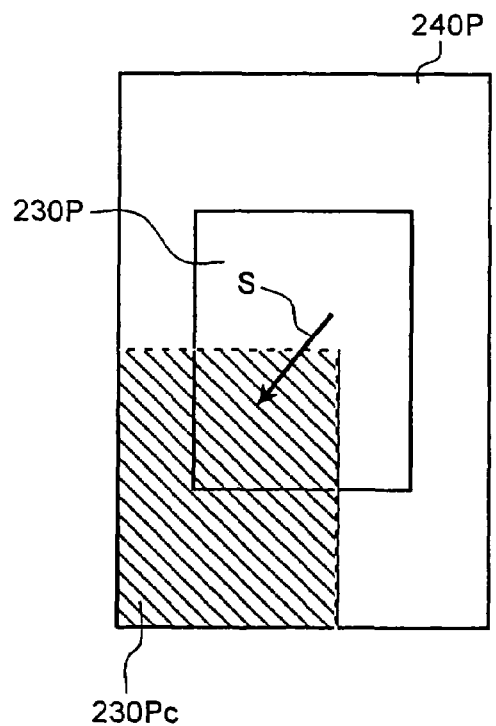
Figure 7D:
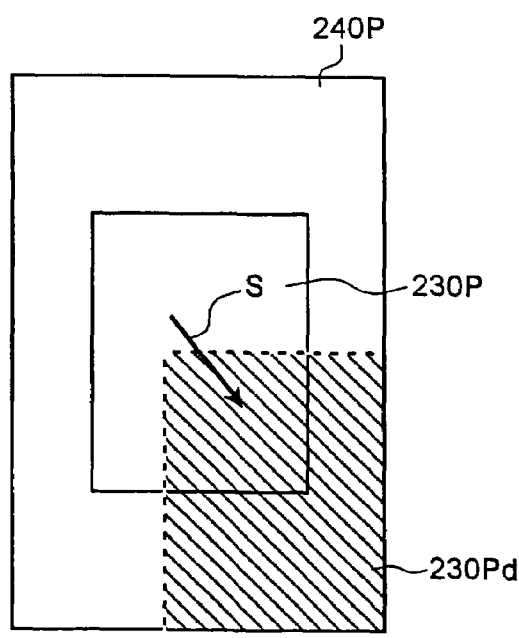

FIG. 7A to FIG. 7D show the identical image 240P and each opening image: 230Pa; 230Pb; 230Pc; and 230Pd. The same explanation as the refracting surface 212a and the opening image 230Pa is applied to: the refracting surface 212b and the opening image 230Pb that are shown in FIG. 7B; the refracting surface 212c and the opening image 230Pc that are shown in FIG. 7C; and the refracting surface 212d and the opening image 230Pd that are shown in FIG. 7D.

Figure 8A:
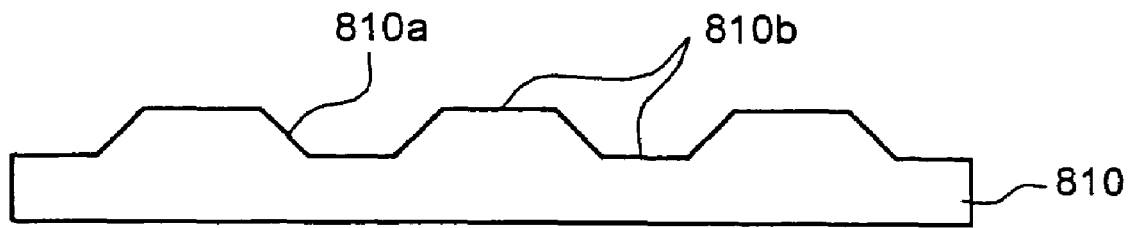
FIG. 8A to FIG. 8D are cross sections of various prism groups.
Figure 8B:
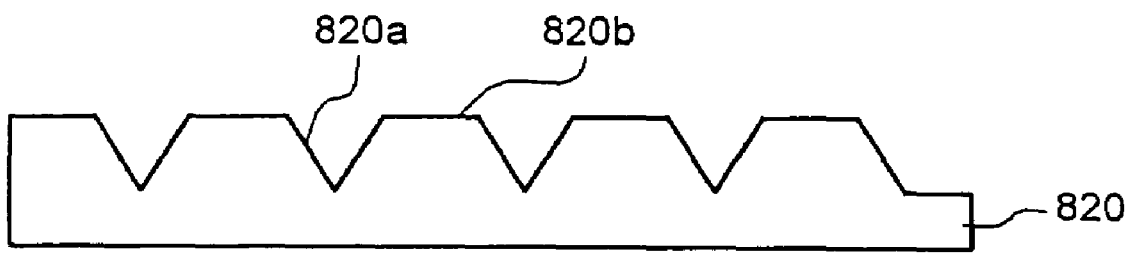
Figure 8C:
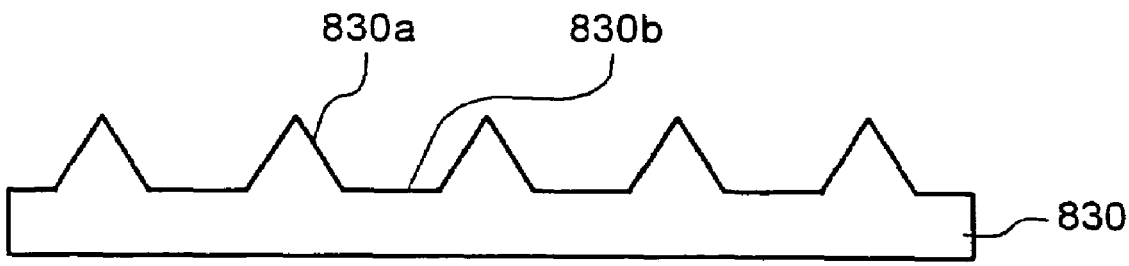
Figure 8D:
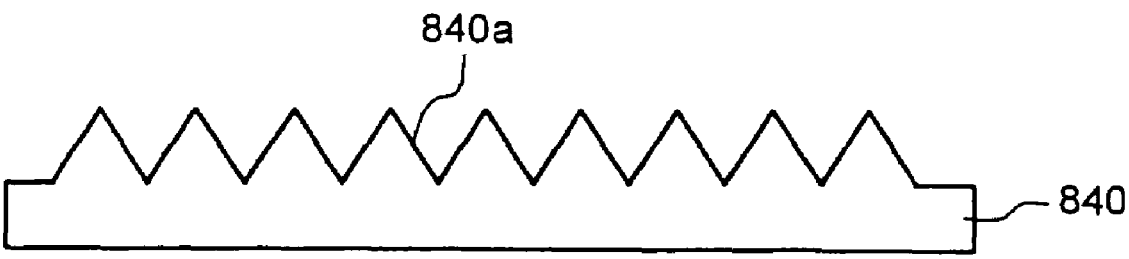

FIG. 8A to FIG. 8D are cross sections of various prism groups. The direction of the refracting surface, the angle of the graduation, and the area determine the shape. FIG. 8A is a sectional view of a prism group 810 with a trapezoidal form that includes a refracting surface 810a and a flat surface 810b. FIG. 8B is a sectional view of a prism group 820 with a triangular form that includes a refracting surface 820a and a flat surface 820b. FIG. 8C is a sectional view of a prism group 830 with a triangular form that includes a refracting surface 830a and a flat surface 830b. FIG. 8D is a sectional view of a prism group 840 with a blaze form that includes a refracting surface 840a.

Figure 9:
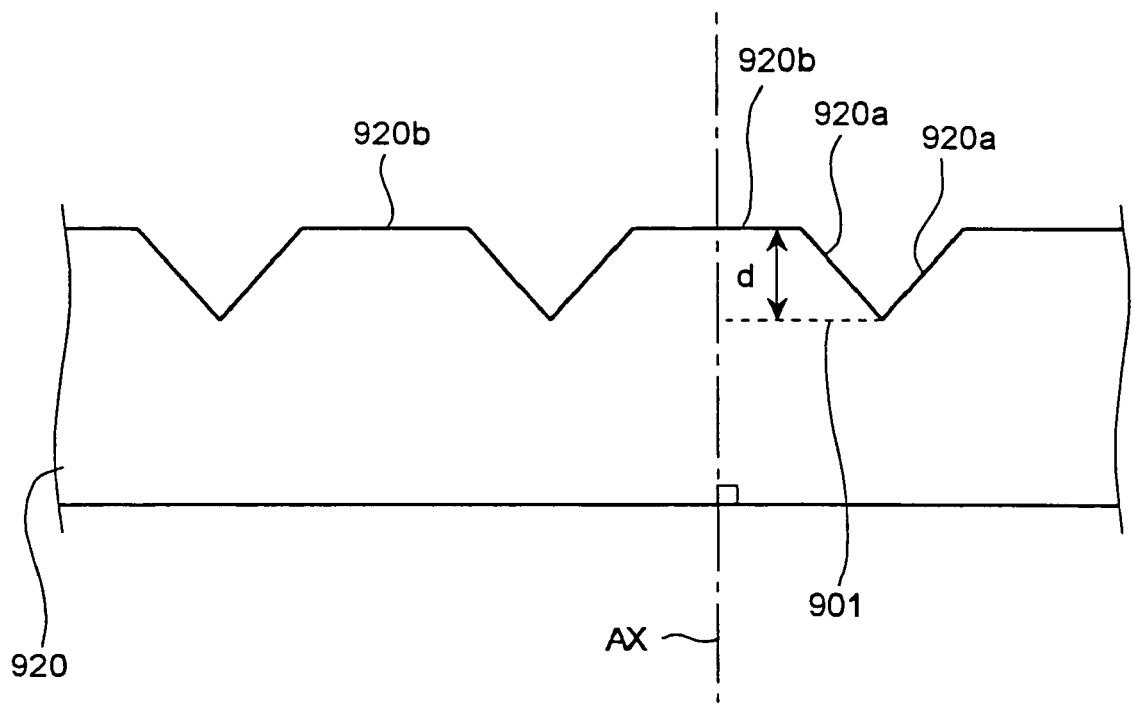
FIG. 9 is a cross section of a prism group according to the first embodiment.

In this manner, the black-matrix image 220 gets blurred 220 using the light refracted on refracting surfaces 212a, 212b, 212c, and 212d. Next, the way to decrease the diffraction light is explained with reference to FIG. 9. To give a clear explanation, the shape of the prism element shown in FIG. 8B is used.

Two refracting surfaces 920a form a V-shaped depression that is periodic. A reference surface 901 is defined to be substantially orthogonal to an optical axis of the incident light and includes an apex of the V-shaped depression. A distance between the reference surface 901 and a flat surface 920b is d. The distance d corresponds to the depth of the V-shaped depression and may be called the depth d. The distance d satisfies any one of the following conditions $$d<0.95'1/(2'(n-1)) \quad (1)$$

$$d>1.05'1/(2'(n-1)) \quad (2)$$

where n is the refractive index of the material of a prism group 920 and 1 is the wavelength of the incident light to the prism group 920. In the present embodiment, the distance d is 1100 mm and, if the depth d satisfies the following condition (A)

$$d=1/(2'(n-1)) \quad (A)$$

the diffraction efficiency improves.

In the present embodiment, the incident light is the visible light of the light that the super-high pressure mercury lamp 101 generates. For example, when the wavelength 1 of the incident light is 480 nm and the refractive index n of the prism group 920 is 1.46, the condition (A) is $$d=480/(2'(1.46-1))=522 \text{ nm.}$$

Another example is that when the wavelength 1 of the incident light is 650 nm and the refractive index n of the prism group 920 is 1.46, the condition (A) is $$d=650/(2'(1.46-1))=707 \text{ nm.}$$

The diffraction occurs effectively if the wavelength 1 of the incident light is 522 nm in the former case and if the wavelength 1 of the incident light is 707 nm in the latter case. In the present embodiment, preferably, the depth d of the V-shaped depression does not cause the diffraction light, or lessens the diffraction to get blurred.

In the present embodiment, the value of the distance d may be various as far as the distance d satisfies any one of the conditions (1) or (2). For example, when the wavelength 1 is 480 nm, the conditions (1) and (2) become $$d < 0.95'1/(2'(n-1)) = 0.95'480/(2'(1.46-1))$$
$$= 496 \text{ nm, and}$$

$$d > 1.05'1/(2'(n-1)) = 1.05'480/(2'(1.46-1))$$
$$= 548 \text{ nm, respectively.}$$

Another example is that when the wavelength 1 is 650 nm, the conditions (1) and (2) become $$d < 0.95'1/(2'(n-1)) = 0.95'650/(2'(1.46-1))$$
$$= 671 \text{ nm, and}$$

$$d > 1.05'1/(2'(n-1)) = 1.05'650/(2'(1.46-1))$$
$$= 742 \text{ nm, respectively.}$$

In the present embodiment, the depth d is 1100 nm and this length satisfies the condition (2) with any wavelengths of the incident light, so that the diffraction light lessens. Accordingly, the watcher sees the high-quality and smooth image without seeing the image of the black matrix.

In the present embodiment, it is preferable that the following condition (3) or (4) is satisfied $$d<0.9'1/(2'(n-1)) \quad (3)$$

$$d>1.1'1/(2'(n-1)) \quad (4)$$

It is more preferable that the following condition (5) or (6) is satisfied $$d<0.7'1/(2'(n-1)) \quad (5)$$

$$d>1.3'1/(2'(n-1)) \quad (6)$$

Satisfying any one of the conditions (3) to (6) lessens the diffraction light more, so that the watcher sees the higher-quality and smoother image.

Figure 10:
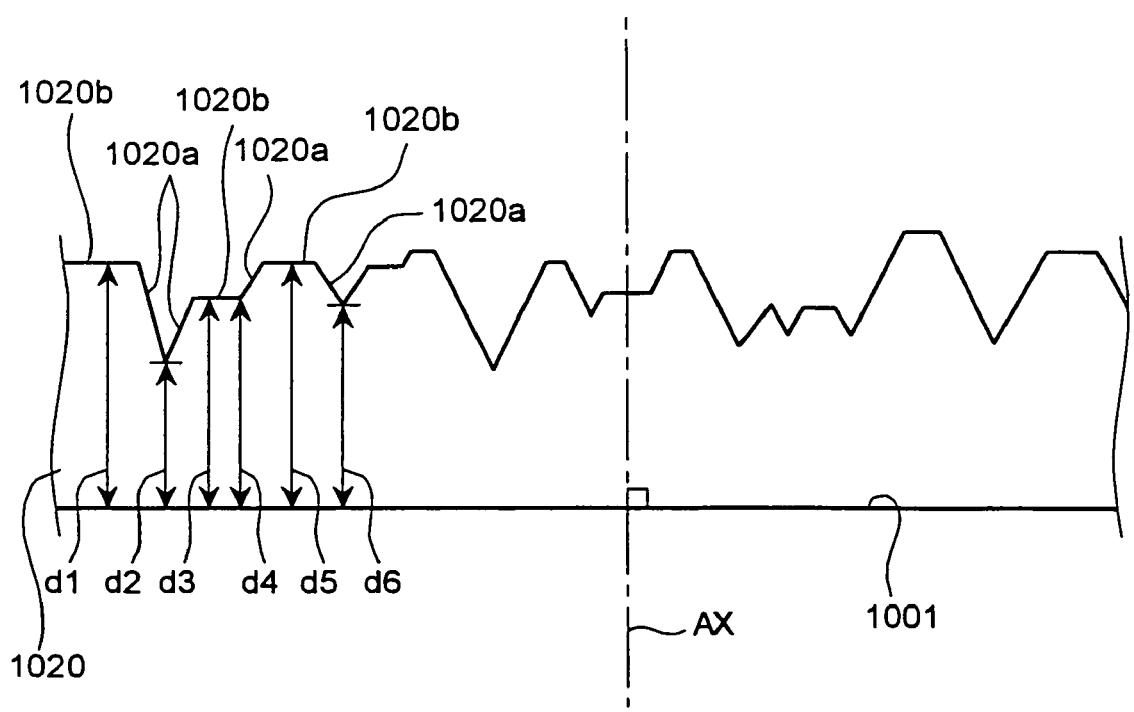
FIG. 10 is a cross section of a prism group according to a second embodiment of the present invention.

FIG. 10 is a cross section of a prism group 1020 of a spatial light modulator according to a second embodiment of the present invention. Except the prism group 1020, the configuration of the second embodiment is basically same as that of the first embodiment and the explanations of the other components are omitted. In the present embodiment, a reference surface 1001 is defined to correspond to a flat surface of a substrate that includes the prism group 1020, and to be substantially orthogonal to an optical axis of the incident light. The distances between the reference surface 1001 and a flat surface 1020b are d1, d3, d5. The distances between the reference surface 1001 and predetermined points are d2, d4, d6. The predetermined points are the nearest points to the reference surface 1001 on the refracting surface 1020a. The distances d1, d3, d5 and the distances d2, d4, d6 are formed to be aperiodic.

One of the causes of that the prism group 1020 causes the diffraction light is the periodic arrangement of the prism elements. In the present embodiment, the arrangement of the prism elements is aperiodic, so that the diffraction light lessens. Consequently, the watcher sees the high-quality and smooth image without seeing the image of the black matrix.

Figure 11A:
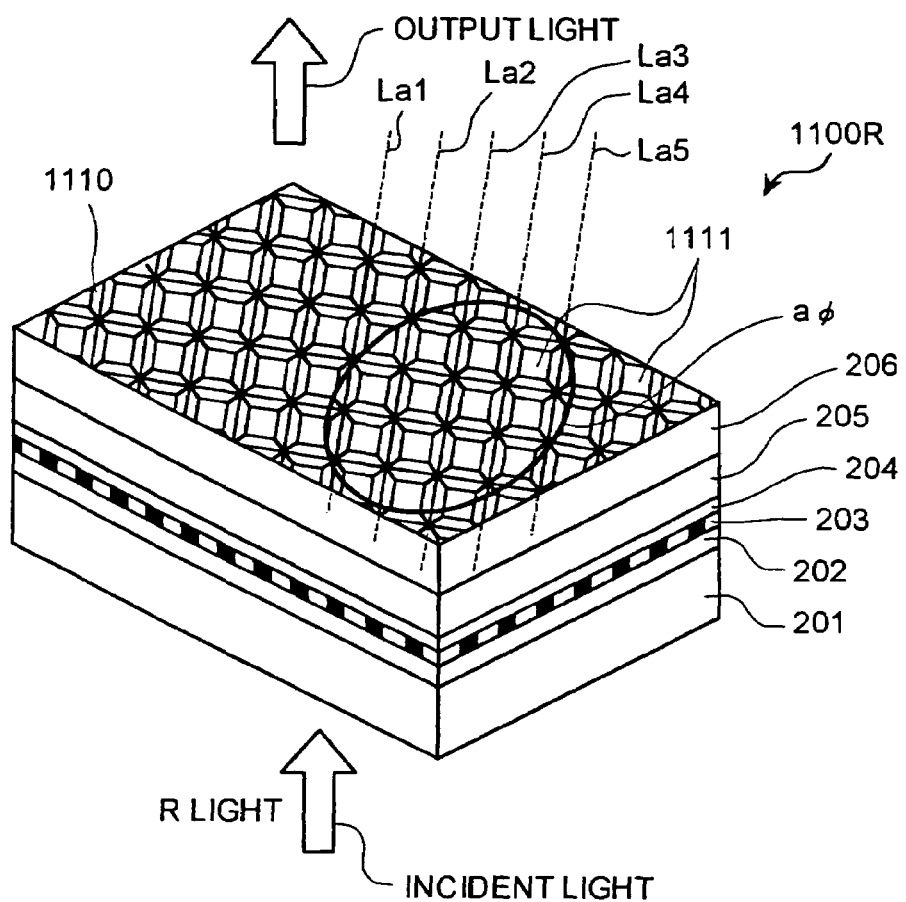
FIG. 11A and FIG. 11B are schematics of a prism group according to a third embodiment of the present invention.

FIG. 11A is a perspective view of a liquid crystal panel 1100R of a spatial light modulator according to a third embodiment of the present invention. The configuration of the third embodiment is basically same as that of the first embodiment, therefore, the same reference symbols as the first embodiment are applied. The liquid crystal panel 1100R is an example of three liquid crystal panels that three special light modulators have respectively.

In the present embodiment, a prism group 1110 is composed of a plurality of prism elements 1111 and the prism elements 1111 are arranged along by lines La1, La2, La3, La4, and La5 that are substantially straight. The number of the lines La1, La2, La3, La4, and La5 per unit area af is five. The number of the lines La1, La2, La3, La4, and La5 per unit area af may be 15 or less.

Figure 11B:
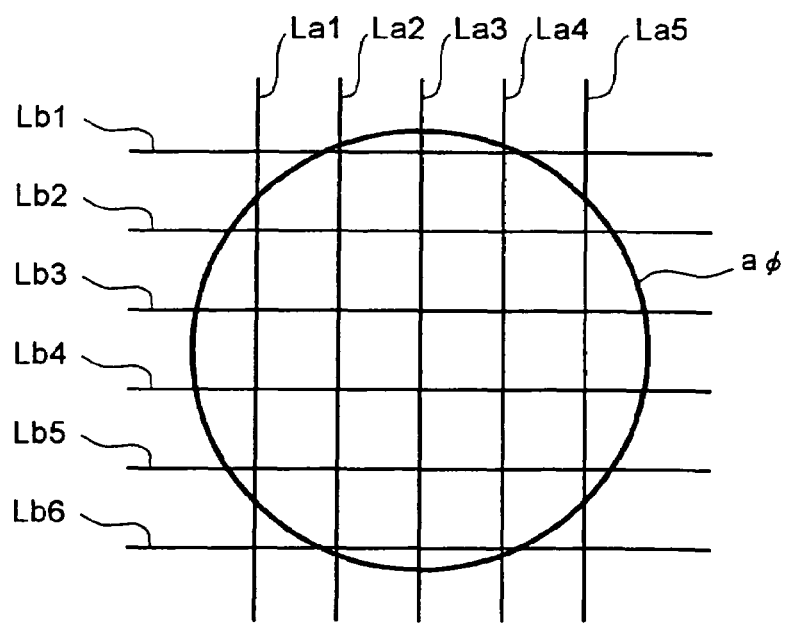

FIG. 11B is a front view of the neighborhood of the unit area af. The prism elements 1111 are formed with substantially orthogonal lattice-pattern. The lines Lb1, Lb2, Lb3, Lb4, Lb5, and Lb6 that are substantially straight are substantially orthogonal to the lines La1 to La5. The unit area af may have 15 or less lines that are orthogonal to the lines La1 to La5.

Figure 12:
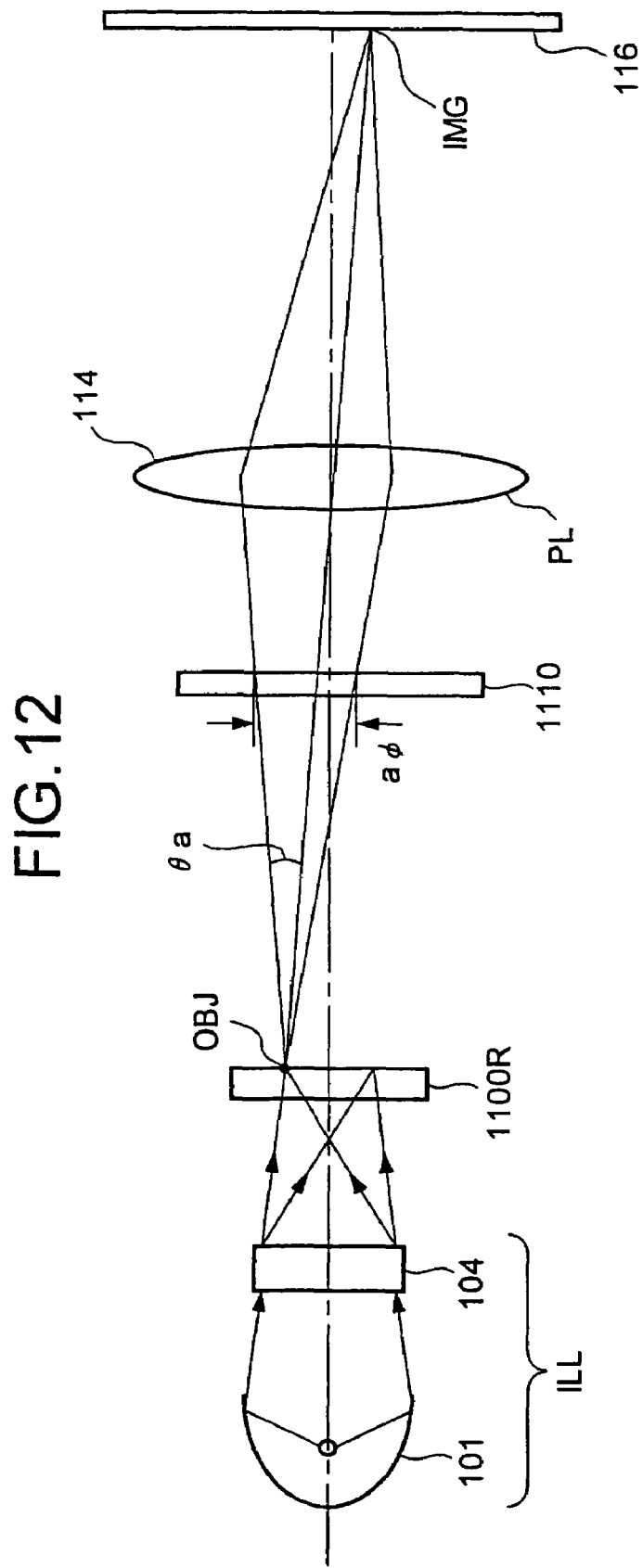
FIG. 12 is a schematic for explaining a unit area according to the third embodiment.

FIG. 12 is a schematic for explaining the unit area af with an optical path from the super-high pressure mercury lamp 101 to the screen 116. For convenience, only the main components are shown, the projection lens 114 is illustrated to be a single biconvex lens, and the prism group 1110 is illustrated separately though the prism group 1110 is included in the liquid crystal panel 1100R actually. The projector 100 includes the components that belong to optical systems such as the illumination optical system (hereinafter, "illumination system ILL"), the projection optical system (hereinafter, "projection system PL"), and the color-separation optical system. The super-high pressure mercury lamp 101 and the integrator belong to the illumination system ILL. The projection lens 114 belongs to the projection system PL and corresponds to the projection system PL in FIG. 12. Any components that belong to the color-separation optical system, such as the red-light transmitting dichroic mirror 106, are not shown in FIG. 12.

The optical path from the super-high pressure mercury lamp 101 to the screen 116 is as follows. The super-high pressure mercury lamp 101 outputs the light to the integrator 104. The integrator 104 illuminates the liquid crystal panel 1100R with the superposed lights that have a predetermined angle distribution, that is, the superposed lights with the various incident angles illuminate a position OBJ that is on the liquid crystal panel. The liquid crystal panel 1100R outputs the light to the prism group 1110 while the light spreads with the F-number of the illumination system ILL. The projection lens 114 receives the light that passes through the prism group 1110 and projects the light on the screen 116 with the F-number that is same as or smaller than the F-number of the projection lens 114. The image of the position OBJ is formed on the position IMG that is on the screen 116 because a position IMG is conjugated with the position OBJ. The F-number of the illumination system ILL (hereinafter, "F-number of ILL") and that of the projection system PL (hereinafter, "F-number of PL") satisfy any one of the following three relational expressions (B) to (D)

the $F$-number of $ILL$ > the $F$-number of $PL$ (B)

the $F$-number of $ILL$ = the $F$-number of $PL$ (C)

the $F$-number of $ILL$ < the $F$-number of $PL$ (D)

In any one of the relationships, the smaller F-number of ILL or F-number of PL determines the angular range, and the light within the angular range is projected on the screen 116 validly. For example, any one of the relational expressions (B) or (C) satisfies the following condition $1/(2FILL) = \sin qa$ where FILL is the F-number of PL, qa is the angle between the optical axis and the emergent light of the position OBJ.

The emergent light from the liquid crystal panel 100R spreads with the angle qa and illuminates the unit area af, which is a circular area on the prism group 1110. Then, the projection lens 114 projects all the emergent light from the unit area on the screen 116. On the other hand, in the relational expression (D), the F-number of ILL determines the unit area af that is projected on the screen 116 validly.

In any relational expressions (B), (C), and (D), the projection lens 114 projects the emergent light from the unit area af on the screen 116. In the present embodiment, the prism group 1110 has the prism elements that are arranged along by the lines La1 to La5 and the lines Lb1 to Lb6 per the unit area af, and the number of the lines La1 to La5 and that of the lines Lb1 to Lb6 are not more than 15, so that the diffraction light ascribable to the periodic arrangement of the prism elements lessens. Consequently, the watcher sees the high-quality and smooth image without seeing the image of the black matrix.

In the unit areas af, the total area of the refracting surface 212 of a unit areas af is equal to those of any other unit areas af, and the total area of the flat surface of a unit areas af is equal to those of any other unit areas af. Therefore, the projection image has less diffraction light and the pixel images are superposed on the black-matrix images on the screen 116 at a predetermined distance from the prism group 1110. Consequently, the watcher sees the smooth and less-rough images without seeing the image of the black matrix.

Preferably, the number of the lines that are substantially straight per the unit area is 10 to 12. More preferably, the number is 7 to 9. The smaller number of the lines lessens the diffraction light ascribable to the periodic arrangement of the prism elements more certainly.

Figure 13A:
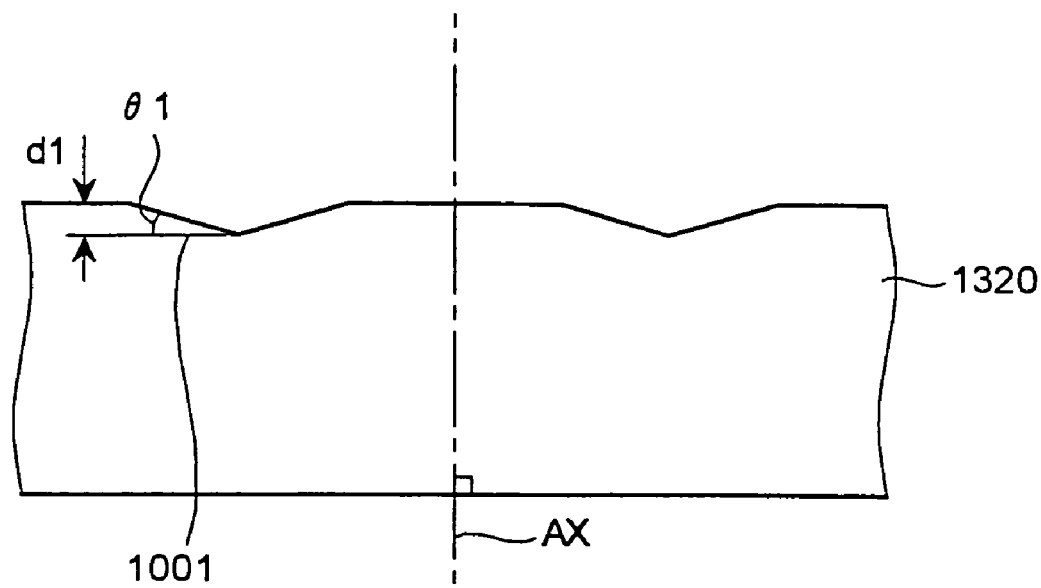
FIG. 13A and FIG. 13B are cross sections of various prism groups with different depths.
Figure 13B:
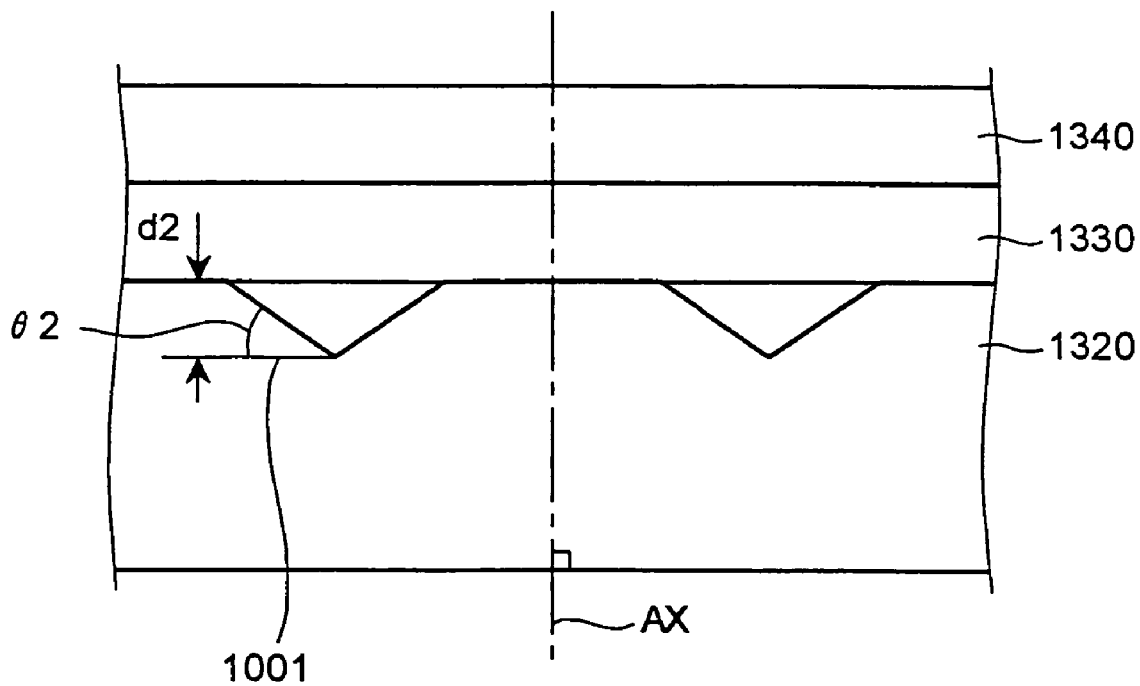
Figure 14A:
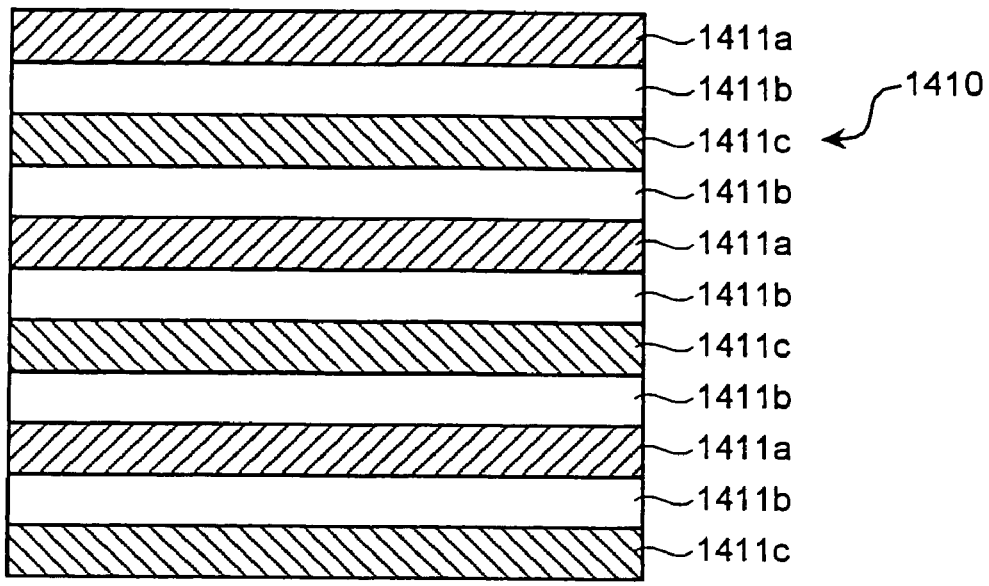
FIG. 14A to FIG. 14D are schematics of a prism group according to a fourth embodiment of the present invention.
Figure 14B:
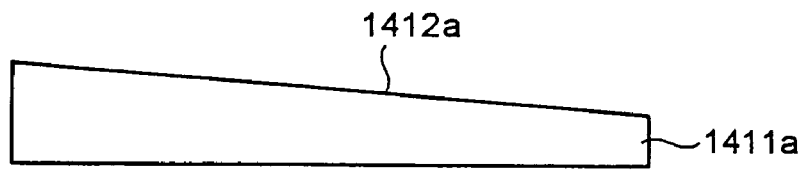
Figure 14C:
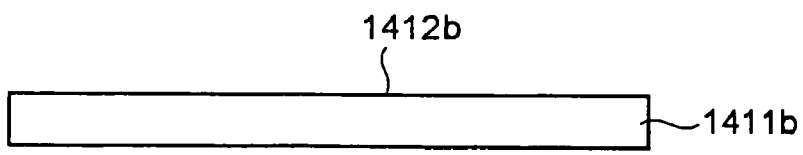
Figure 14D:
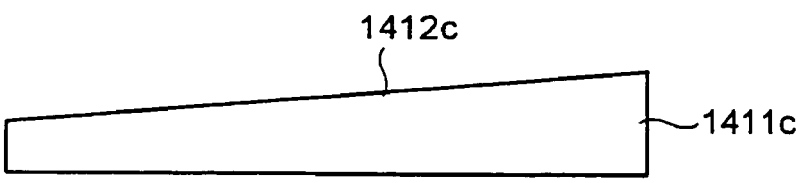

FIG. 13A is a cross section of the prism group 1320 that is made of glass. The depth d1 is approximately 30 μm and the angle q1 between the reference surface 1001 and the refracting surface is approximately 0.06 degree. FIG. 13B is a cross section of the prism group 1320 made of acrylic or ZEONEX (a trade name). On the prism group 1320, a resin substrate 1330, which is optical transparent, and a glass substrate 1340 are formed. The depth d2 is approximately 1 mm and the angle q2 is approximately 0.97 degree. The structure shown in FIG. 13B is made more easily than that shown in FIG. 13A because the former structure has the larger values of the depth and the angle than the latter structure.

FIG. 14A to FIG. 14D are schematics of a prism group 1410 of a spatial light modulator according to a fourth embodiment of the present invention. Except the prism group 1410, the configuration of the fourth embodiment is same as that of the first embodiment and the explanations of the other components are omitted. The prism group 1410 is composed of three types of prism elements 1411a, 1411b, and 1411c. When a set of is considered to have the prism elements 1411a, 1411b, 1411c and 1411b that are arranged in the described order and adhered to each other, a plurality of the sets are adhered to each other to compose the prism group 1410. The prism elements 1411a is a zonal prism element with the refracting surfaces 1412a, and the prism element 1411c with the refracting surface 1412c corresponds the prism element 1411a that is flipped horizontally. The prism element 1411b is a parallel flat plate that includes a flat surface 1412b. The two prism groups 1410 may be overlapped substantially orthogonally to have the same function as the prism group that includes the flat surface 1411b and the refracting surfaces 1411a, 1411c that refract the lights that are substantially orthogonal each other.

In the present embodiment, the diffraction lessens in the following simple way: manufacturing the prism elements 1411a, 1411b, and 1411c that are substantially flat plates; and arranging 15 or less prism elements 1411a, 1411b, and 1411c per unit area af.

Figure 15A:
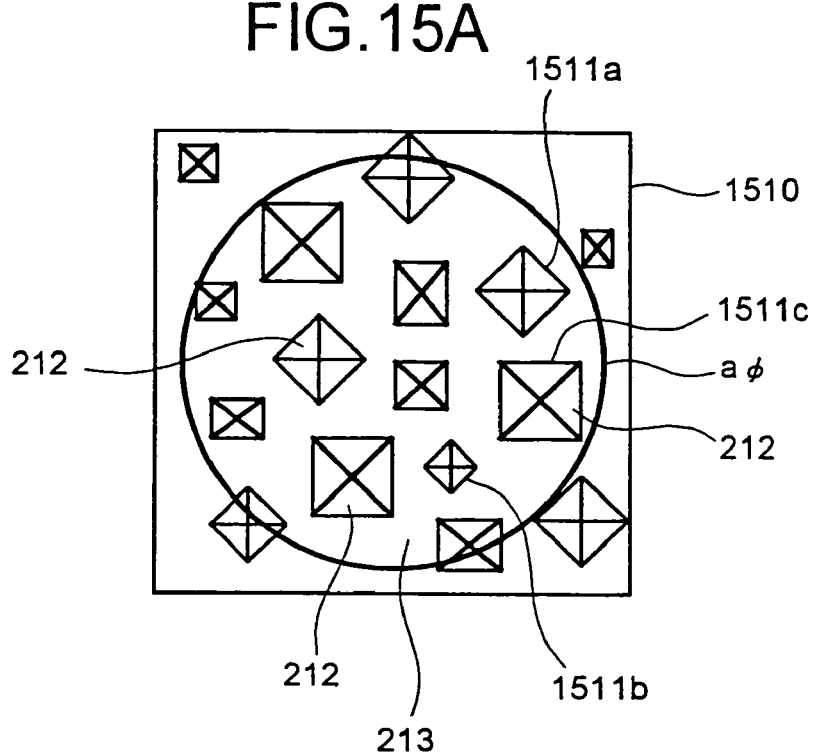
FIG. 15A and FIG. 15B are schematics of a prism group according to a fifth embodiment of the present invention.

FIG. 15A is a front view of a prism group 1510 of a spatial light modulator according to a fifth embodiment of the present invention. Except the prism group 1510, the configuration of the fifth embodiment is same as that of the first embodiment and the explanations of the other components are omitted. Prism elements 1511a, 1511b, and 1511c is formed to have the random depths and are arranged in the unit area af at random. In the unit areas af, the total area of the refracting surface 212 of a unit areas af is equal to those of any other unit areas af, and the total area of the flat surface 213 of a unit areas af is equal to those of any other unit areas af.

Figure 15B:
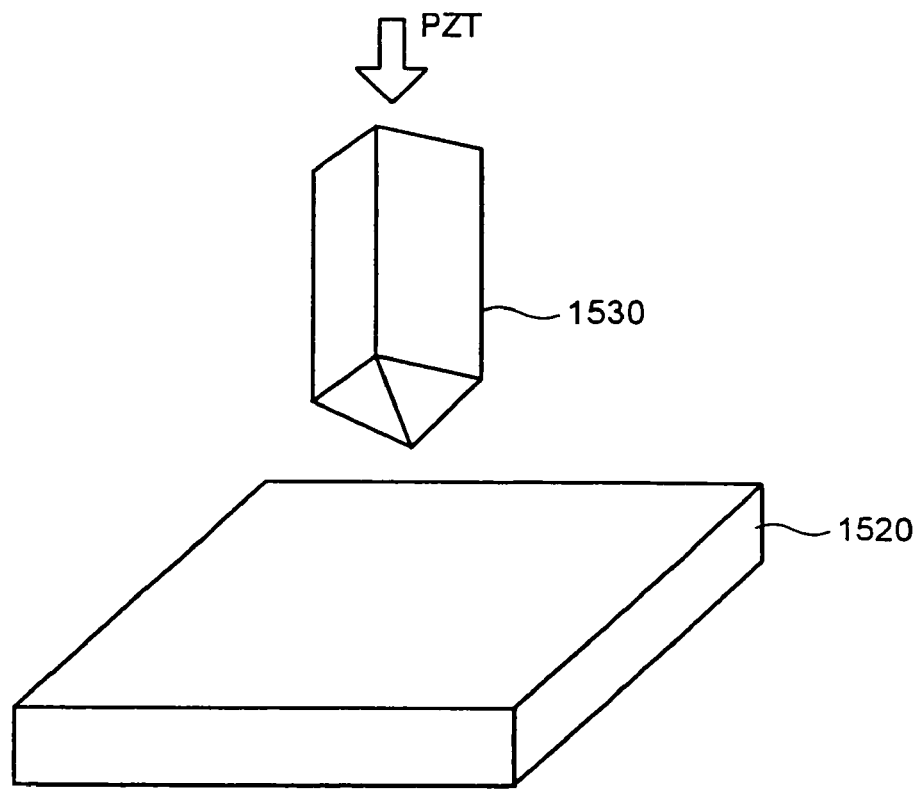

A manufacturing method of the prism group 1510 is explained with reference to FIG. 15B. To form the prism elements that compose the prism group 1510, a piezo actuator (not shown) or the like is used to press a substrate 1520 that is made of acrylic using a mold 1530 that has a pyramid-shaped tip. In the present method, the depth and the direction of the prism element respectively depend on the force and the direction with which the mold 1530 is pressed into the substrate 1520. When the prism group 1510 is formed according to the present manufacturing method, the projection image has less diffraction light, and the pixel images are superposed on the black-matrix images on the screen at a predetermined distance from the prism group 1510. Consequently, the watcher sees the smooth and less-rough images without seeing the black-matrix image.

The present invention does not limit the configurations to five embodiments described above. As far as the prism group does not cause the diffraction light, or the prism group lessens the diffraction light enough so that the diffraction light get blurred, any configurations may be any combinations of five embodiments.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A projector comprising:
   an illumination optical system that illuminates a spatial light modulator, the spatial light modulator includes
      a modulating unit that modulates the light based on an image signal and outputs a modulated light;
      a refracting part that refracts the modulated light; and
      a flat part that transmits the modulated light, wherein the modulating unit includes
         a plurality of pixels that are arranged in a matrix; and
         a light-shielding portion between each of the pixels,
   the refracting part is a prism group that is composed of a plurality of prism elements, each of the prism elements having at least a refracting surface,
   the modulated light from one of the pixels is incident on at least a portion of the prism group,
   the prism group is arranged in a substantially periodic manner, with number of the periods being 15 or less per a unit area, wherein the unit area is a circular area on the prism group; and
   a projection optical system that is disposed after the spatial light modulator, the projection optical system including a projection lens that projects the light from the spatial light modulator to display an image on a screen, wherein
   the unit area on the prism group is determined by an F-number of the projection optical system when an F-number of the illumination optical system is equal to or larger than the F-number of the projection optical system, and the unit area is determined by the F-number of the illumination optical system when the F-number of the illumination optical system is smaller than the F-number of the projection optical system, and
   the refracting surface, being formed to have an angle with respect to a reference surface that is orthogonal to an optical axis, is configured to refract the modulated light which entered into the refracting surface so that an image of the pixel is superposed over an image of the light-shielding portion on the screen at a predetermined distance from the prism group through the projection lens.

2. The projector according to claim 1, wherein the number of the periods per unit area is any one of 10 to 12.

3. The projector according to claim 1, wherein the number of the periods per unit area is any one of 7 to 9.

* * * * *